(12) United States Patent
Farah et al.

(10) Patent No.: US 10,240,468 B2
(45) Date of Patent: Mar. 26, 2019

(54) TURBINE ENGINE VANE ARRANGEMENT HAVING A PLURALITY OF INTERCONNECTED VANE ARRANGEMENT SEGMENTS

(71) Applicant: United Technologies Corporation, Hartford, CT (US)

(72) Inventors: Jorge I. Farah, Hartford, CT (US); Jonathan P. Burt, Sturbridge, MA (US); Dana P. Stewart, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 672 days.

(21) Appl. No.: 14/432,432

(22) PCT Filed: Jan. 9, 2013

(86) PCT No.: PCT/US2013/020832
§ 371 (c)(1),
(2) Date: Mar. 30, 2015

(87) PCT Pub. No.: WO2014/051656
PCT Pub. Date: Apr. 3, 2014

(65) Prior Publication Data
US 2015/0292343 A1    Oct. 15, 2015

Related U.S. Application Data

(60) Provisional application No. 61/707,505, filed on Sep. 28, 2012.

(51) Int. Cl.
*F01D 9/04* (2006.01)
*F04D 29/54* (2006.01)
*B23P 15/04* (2006.01)

(52) U.S. Cl.
CPC .............. *F01D 9/042* (2013.01); *B23P 15/04* (2013.01); *F01D 9/044* (2013.01); *F04D 29/544* (2013.01)

(58) Field of Classification Search
CPC ... F01D 9/044; F01D 9/02; F01D 9/04; F01D 9/042; F01D 11/18; F01D 5/3069;
(Continued)

(56) References Cited

U.S. PATENT DOCUMENTS 3,393,436 A     7/1968  Vaughan et al.
3,678,555 A  *  7/1972  Hansen .................. F01D 5/081
                                                                228/182
(Continued)

OTHER PUBLICATIONS

EP search report for EP13841332 dated Apr. 6, 2016.

*Primary Examiner* — David E Sosnowski
*Assistant Examiner* — Eric J Zamora Alvarez
(74) *Attorney, Agent, or Firm* — O'Shea Getz P.C.

(57) ABSTRACT

A turbine engine vane arrangement and a method for manufacturing a turbine engine vane arrangement are provided. The vane arrangement includes a plurality of vane arrangement segments arranged circumferentially around an axial centerline. Each of the vane arrangement segments includes an airfoil that extends radially between a first platform segment and a second platform segment. The first platform segment extends circumferentially between a first mate face and a second mate face. The first mate face of a first of the vane arrangement segments is bonded to the second mate face of a second of the vane arrangement segments.

10 Claims, 7 Drawing Sheets

(58) Field of Classification Search
CPC . F01D 5/32; F01D 5/323; F01D 5/326; F01D 25/246; B23P 15/04
USPC .................................. 415/194, 195
See application file for complete search history.

(56) References Cited

U.S. PATENT DOCUMENTS

| | | | |
|---|---|---|---|
| 5,174,715 A | 12/1992 | Martin | |
| 6,514,041 B1 | 2/2003 | Matheny et al. | |
| 6,821,087 B2 * | 11/2004 | Matsumoto | F01D 5/282 415/191 |
| 7,097,420 B2 * | 8/2006 | Cormier | F01D 9/041 29/889.22 |
| 7,341,427 B2 * | 3/2008 | Farmer | F01D 5/288 415/115 |
| 7,748,956 B2 * | 7/2010 | Paulino | B23K 15/0006 29/889.22 |
| 8,277,166 B2 * | 10/2012 | Tecza | F01D 9/041 415/1 |
| 2004/0096323 A1 | 5/2004 | Hagle et al. | |
| 2008/0289179 A1 * | 11/2008 | Pellet | B23P 6/002 29/889.1 |
| 2008/0298973 A1 | 12/2008 | Marini | |
| 2009/0185899 A1 | 7/2009 | Bouchard et al. | |
| 2010/0162725 A1 | 7/2010 | Zeaton et al. | |
| 2011/0268575 A1 | 11/2011 | Steffenburg-Nordenstrom et al. | |
| 2012/0099996 A1 * | 4/2012 | Delvaux | F01D 5/3007 416/204 A |

* cited by examiner

TURBINE ENGINE VANE ARRANGEMENT HAVING A PLURALITY OF INTERCONNECTED VANE ARRANGEMENT SEGMENTS

This application claims priority to PCT Application N. PCT/US13/20832 filed Jan. 9, 2013, which claims priority to U.S. Provisional Appln. No. 61/707,505 filed Sep. 28, 2012, which is hereby incorporated by reference.

BACKGROUND OF THE INVENTION

1. Technical Field

This disclosure relates generally to a turbine engine and, more particularly, to a stator vane arrangement that includes a plurality of vane arrangement segments.

2. Background Information

A typical turbine engine includes a plurality of engine sections such as, for example, a fan section, a compressor section, a combustor section and a turbine section. The turbine engine may also include a stator vane arrangement. The vane arrangement may be configured to guide core gas between adjacent rotor stages within a respective one of the engine sections. Alternatively, the vane arrangement may be configured to guide core gas between an adjacent pair of the engine sections.

A typical stator vane arrangement includes a plurality of vane arrangement segments, which may be individually connected to a turbine engine case. The vane arrangement segments may each include a vane airfoil that extends radially between a radial inner platform segment and a radial outer platform segment. Each of the inner platform segments extends circumferentially between respective inner mate (e.g., slash) faces. Each of the outer platform segments extends circumferentially between respective outer mate faces. A plurality of feather seals may respectively seal (i) gaps between the inner mate faces of adjacent inner platform segments, and (ii) gaps between the outer mate faces of adjacent outer platform segments.

The stator vane arrangement may be subject to temperature and/or pressure differentials during turbine engine operation. Such temperature and/or pressure differentials may cause the vane arrangement segments to deform and/or move (e.g., radially, axially and/or circumferentially shift) relative to one another. The inner and/or the outer platform segments, for example, may respectively shingle relative to one another. The term "shingle" may describe stator vane arrangement deformation where the mate face of one platform segment may move radially relative to the mate face of an adjacent platform segment. Such deformations and/or movements may reduce the effectiveness of the feather seals and enable fluid leakage through the gaps.

SUMMARY OF THE DISCLOSURE

According to a first aspect of the invention, a turbine engine vane arrangement (e.g., a turbine section vane arrangement) is provided that includes a plurality of vane arrangement segments (e.g., turbine section vane arrangement segments), which are arranged circumferentially around an axial centerline. Each of the vane arrangement segments includes an airfoil that extends radially between a first platform segment and a second platform segment. The first platform segment extends circumferentially between a first mate face and a second mate face. The first mate face of a first of the vane arrangement segments is bonded (e.g., brazed) to the second mate face of a second of the vane arrangement segments.

According to another aspect of the invention, a turbine engine vane arrangement is provided that includes a plurality of vane arrangement segments arranged circumferentially around an axial centerline. The vane arrangement segments include a first segment and a circumferentially adjacent second segment. Each of the vane arrangement segments includes a respective airfoil extending between a respective radial inner platform segment and a respective radial outer platform segment. Each of the inner and the outer platform segments extends between opposing mate faces such that the first segment includes a first inner mate face and a first outer mate face, and the second segment includes a second inner mate face and a second outer mate face. The first inner mate face is bonded (e.g., brazed) to the second inner mate face. In addition or alternatively, the first outer mate face is bonded (e.g., brazed) to the second outer mate face.

The first platform segment may be configured as a radial inner platform segment, and the second platform segment may be configured as a radial outer platform segment. Alternatively, the first platform segment may be configured as a radial outer platform segment, and the second platform segment may be configured as a radial inner platform segment.

The second platform segment may extend circumferentially between a first mate face and a second mate face. The first mate face of the second platform segment of the first of the vane arrangement segments may be bonded (e.g., brazed) to the second mate face of the second platform segment of the second of the vane arrangement segments.

The airfoil, the first platform segment and the second platform segment of at least one of the vane arrangement segments may be formed integral to one another; e.g., cast as a unitary stator vane singlet. In another embodiment, at least one of the vane arrangement segments may include at least one additional airfoil. The airfoils, the first platform segment and the second platform segment may be formed integral to one another; e.g., cast as a unitary stator vane doublet.

Each first platform segment may have a width that extends circumferentially between the first mate face and the second mate face. The width of one of the vane arrangement segments may be different than the width of another one of the vane arrangement segments.

The turbine engine vane arrangement may include an annular band (e.g., a structural shear band) arranged radially within or circumferentially around the vane arrangement segments. The band may be connected (e.g., bonded or mechanically fastened) to one or more of the vane arrangement segments.

According to another aspect of the invention, a method is provided for manufacturing a turbine engine vane arrangement (e.g., a turbine section vane arrangement). The turbine engine vane arrangement includes a plurality of vane arrangement segments (e.g., turbine section vane arrangement segments). Each of the vane arrangement segments includes an airfoil that extends radially between a first platform segment and a second platform segment. The first platform segment extends circumferentially between a first mate face and a second mate face. The method includes configuring the vane arrangement segments circumferentially around an axial centerline, and connecting the vane arrangement segments together. The connecting includes at least bonding (e.g., brazing) the first mate face of a first of the vane arrangement segments to the second mate face of a second of the vane arrangement segments.

The second platform segment may extend circumferentially between a first mate face and a second mate face. The step of connecting may also include bonding (e.g., brazing) the first mate face of the second platform segment of the first of the vane arrangement segments to the second mate face of the second platform segment of the second of the vane arrangement segments.

A plurality of the vane arrangement segments may be configured as base segments, and at least one of the vane arrangement segments may be configured as a keystone segment. The step of configuring may include arranging the base segments circumferentially around the axial centerline, where a keystone gap extends circumferentially between a pair of the base segments. The keystone segment may be machined to circumferentially fit within the keystone gap, and the machined keystone segment may be arranged between the pair of the base segments that defines the keystone gap. Alternatively or additionally, at least one of the pair of the base segments may be machined such that the keystone segment circumferentially fits within the keystone gap, and the keystone segment may be arranged between the pair of the base segments within the keystone gap.

The step of machining may include machining the first mate face and/or the second mate face of the keystone segment. Each of the first platforms may have a width that extends circumferentially between the first mate face and the second mate face. The width of at least one of the base segments may be greater than or equal to the width of the keystone segment. The method may also include a step of machining the first mate face and/or the second mate face of one or more the base segments such that the widths of the base segments are substantially equal.

An annular band (e.g., a structural shear band) may be arranged radially within or circumferentially around the vane arrangement segments. The band may be connected (e.g., bonded or mechanically fastened) to one or more of the vane arrangement segments.

The foregoing features and the operation of the invention will become more apparent in light of the following description and the accompanying drawings.

DETAILED DESCRIPTION OF THE INVENTION

Figure 1:
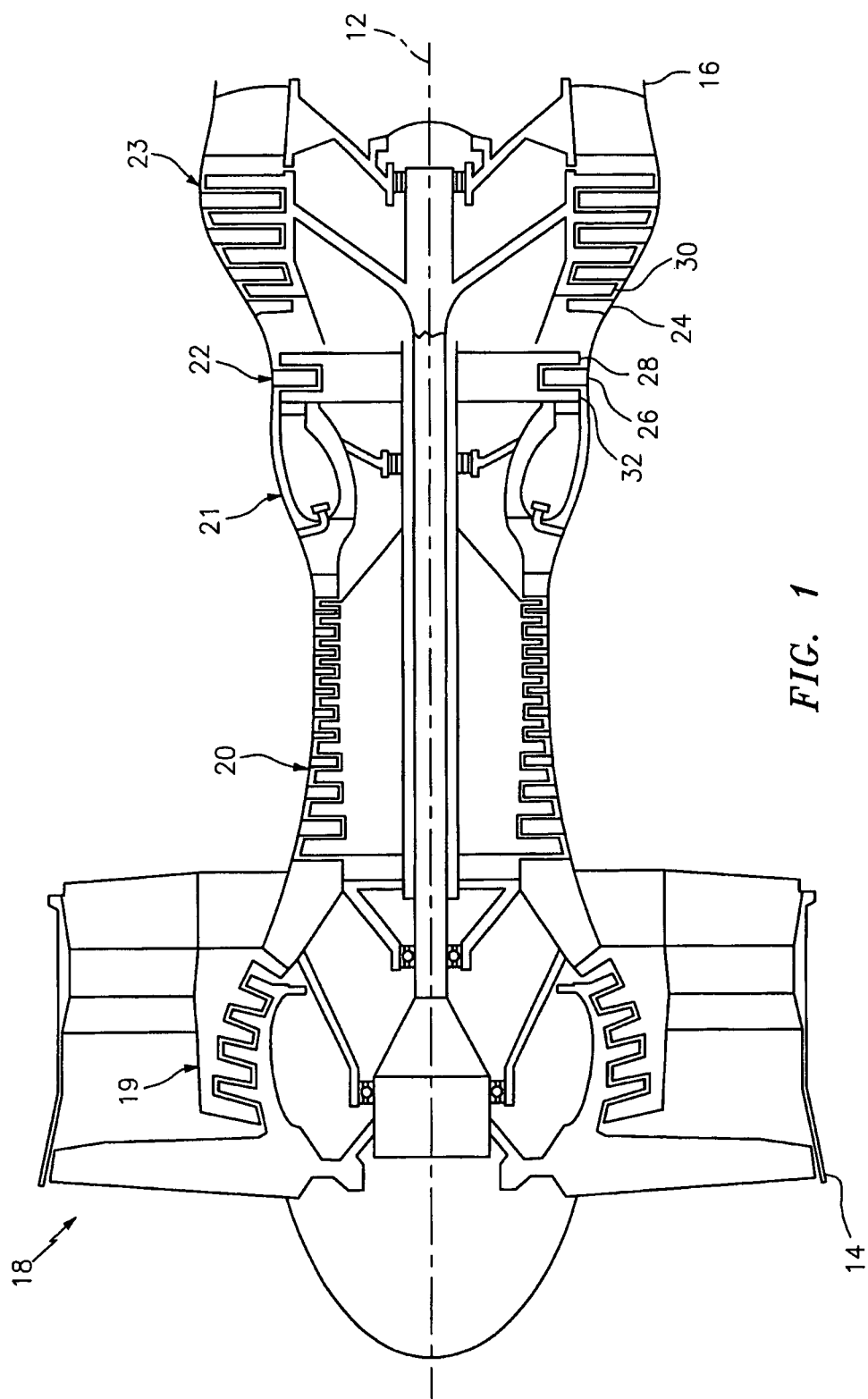
FIG. 1 is a schematic illustration of a turbine engine.

FIG. 1 illustrates a turbine engine 10 that extends along an axial centerline 12 between an upstream, airflow inlet 14 and a downstream, airflow exhaust 16. The turbine engine 10 includes a plurality of turbine engine sections such as, for example, a fan section 18, one or more (e.g., low and high pressure) compressor sections 19 and 20, a combustor section 21, and one or more (e.g., high and low pressure) turbine sections 22 and 23, which are sequentially arranged along the axial centerline 12. The turbine engine 10 also includes one or more stator vane arrangements (e.g., 24 and 26).

At least one of the stator vane arrangements may be configured to guide fluid between two of the turbine engine sections 18-23. The stator vane arrangement 24, for example, is configured to guide core gas from a rotor stage 28 of the turbine section 22 to an axially adjacent rotor stage 30 of the turbine section 23. At least one of the stator vane arrangements may also or alternatively be configured to guide fluid between adjacent rotor stages of a respective one of the turbine engine sections 18-23. The stator vane arrangement 26, for example, is configured to guide core gas between adjacent rotor stages 32 and 28 of the turbine section 22.

Figure 2:
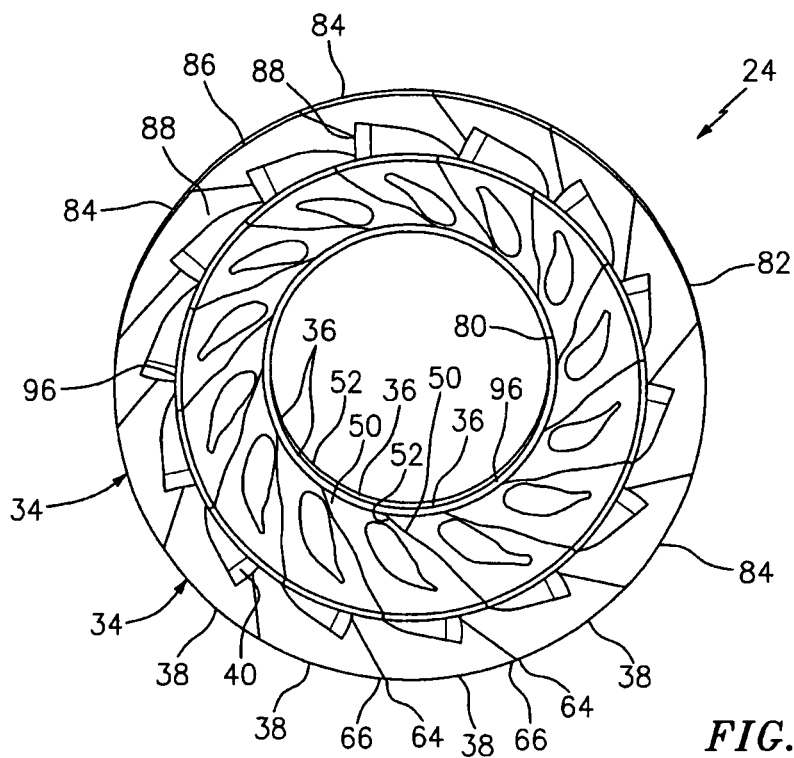
FIG. 2 is a perspective illustration of an end of a stator vane arrangement included in the turbine engine of FIG. 1.
Figure 3:
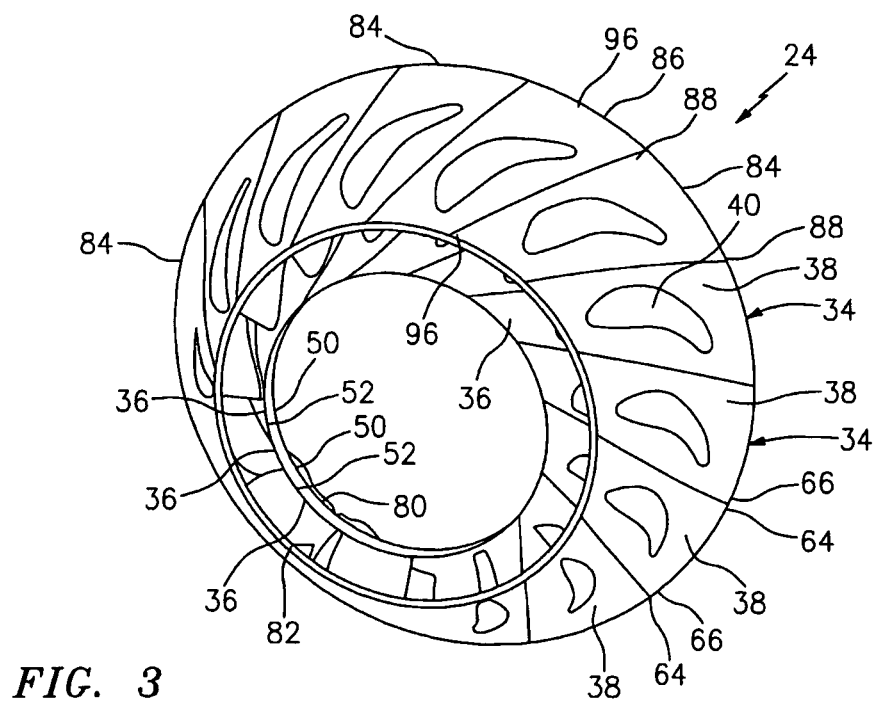
FIG. 3 is a perspective illustration of another end of the stator vane arrangement of FIG. 2.

Referring to FIGS. 2 and 3, one or more of the stator vane arrangements (e.g., the stator vane arrangement 24) includes a plurality of vane arrangement segments 34. Each of the vane arrangement segments 34 includes a radial inner platform segment 36, a radial outer platform segment 38 and a stator vane airfoil 40 (e.g., a hollow stator vane airfoil). In the vane arrangement segment 34 of FIG. 4, the inner platform segment 36, the outer platform segment 38 and the vane airfoil 40 are formed integral with one another; e.g., cast as a unitary stator vane singlet.

Figure 4:
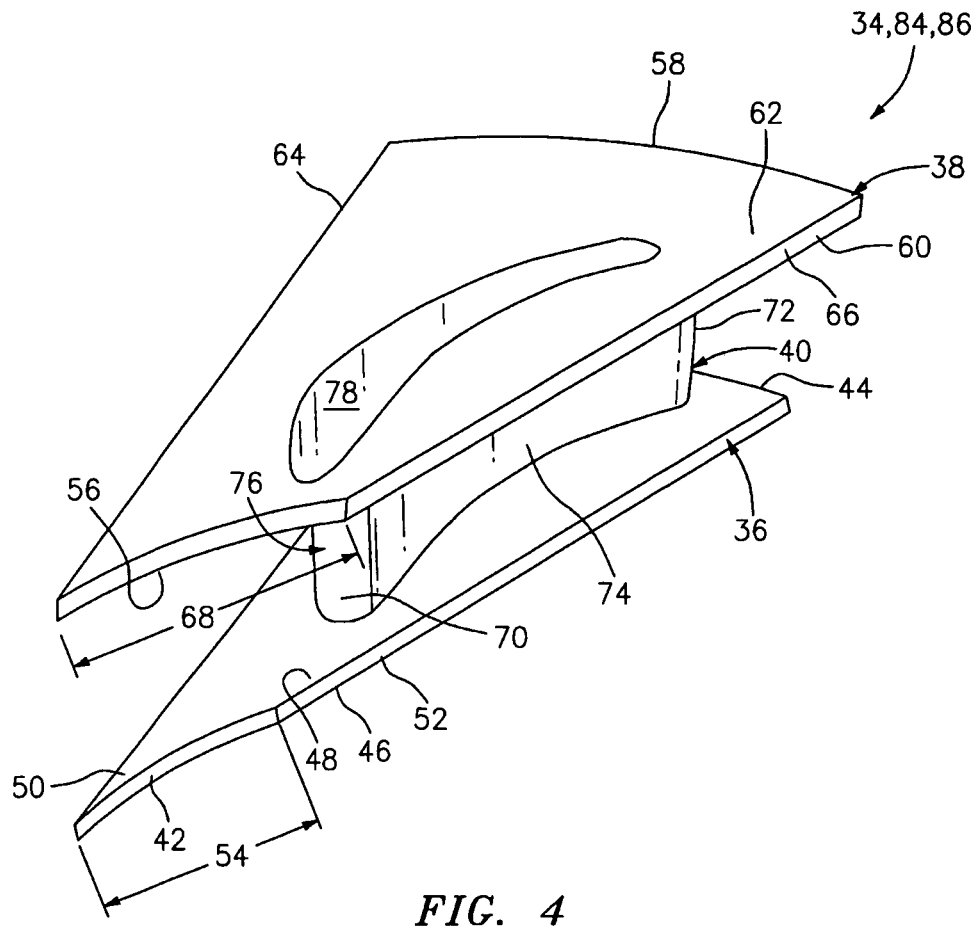
FIG. 4 is a perspective illustration of a vane arrangement segment included in the stator vane arrangement of FIG. 2.

Referring still to FIG. 4, the inner platform segment 36 extends axially between an upstream platform end 42 and a downstream platform end 44. The inner platform segment 36 extends radially between a radial inner platform surface 46 and a radial outer platform gaspath surface 48. The inner platform segment 36 also extends circumferentially between a first mate (e.g., slash) face 50 and a second mate face 52, which define a circumferential inner platform width 54 therebetween. In the vane arrangement segment 34 of FIG. 4, the inner platform width 54 is measured at (e.g., on, adjacent or proximate to) the upstream platform end 42 for ease of illustration. The inner platform width 54, however, may alternatively be measured at the downstream platform end 44 or at another location (e.g., centrally) between the upstream and the downstream platform ends 42 and 44.

The outer platform segment 38 extends axially between an upstream platform end 56 and a downstream platform end 58. The outer platform segment 38 extends radially between a radial inner platform gaspath surface 60 and a radial outer platform surface 62. The outer platform segment 38 also extends circumferentially between a first mate face 64 and a second mate face 66, which define a circumferential outer platform width 68 therebetween. In the vane arrangement segment 34 of FIG. 4, the outer platform width 68 is measured at the upstream platform end 56 for ease of illustration. The outer platform width 68, however, may alternatively be measured at the downstream platform end 58 or at another location (e.g., centrally) between the upstream and the downstream platform ends 56 and 58.

The vane airfoil 40 extends axially between a leading edge 70 and a trailing edge 72. The vane airfoil 40 extends radially between the inner and the outer platform gaspath surfaces 48 and 60. The vane airfoil 40 also extends laterally (e.g., generally circumferentially) between a concave surface 74 and a convex surface 76. A conduit 78 may extend radially through the vane airfoil 40 as well as the inner and/or the outer platform segments 36 and 38.

Referring to FIGS. 2 and 3, the vane arrangement segments 34 are arranged circumferentially around the axial centerline. The first mate face 50 of one (e.g., each) of the inner platform segments 36 is bonded (e.g., brazed, welded, or otherwise adhered) to the second mate face 52 of a respective adjacent inner platform segment 36. These interconnected (e.g., circumferentially bonded) inner platform segments 36 form an annular, radial inner vane arrangement platform 80. The first mate face 64 of one (e.g., each) of the outer platform segments 38 is bonded to the second mate face 66 of a respective adjacent outer platform segment 38. These interconnected outer platform segments 38 form an annular, radial outer vane arrangement platform 82.

A stator vane arrangement such as, for example, the stator vane arrangement 24 of FIGS. 2 and 3 may be subject to temperature and/or pressure differentials during turbine engine 10 operation. Such temperature and/or pressure differentials may cause prior art vane arrangement segments to deform and/or move (e.g., radially, axially and/or circumferentially shift) relative to another, which may enable fluid leakage as described above. In contrast, the bonding between the adjacent inner platform segments 36 and/or the adjacent outer platform segments 38 may significantly reduce or prevent such fluid leakage. The bonding, for example, enables the inner and the outer vane arrangement platforms 80 and 82 to respectively expand, contract and/or otherwise deform as substantially unitary bodies.

Figure 5:
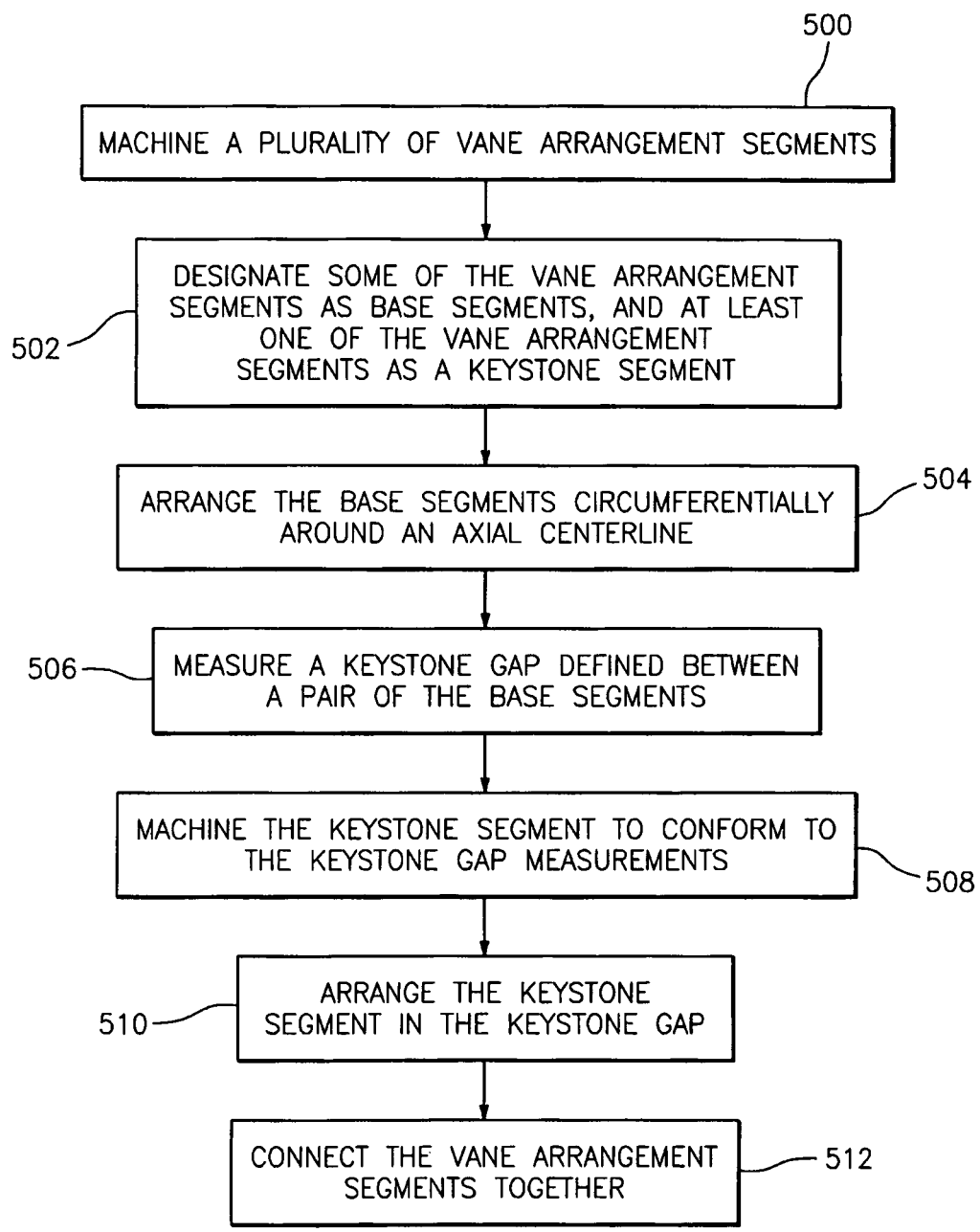
FIG. 5 is a flow diagram of a method for manufacturing the stator vane arrangement of FIG. 2.

FIG. 5 is a flow diagram of a method for manufacturing the stator vane arrangement 24 of FIGS. 2 and 3 utilizing, for example, a plurality of preformed (e.g., cast) vane arrangement segments. These preformed vane arrangement segments may have the general configuration and dimensions of the vane arrangement segment 34 of FIG. 4. The preformed vane arrangement segments therefore are generally referred to below as the vane arrangement segments 34 for ease of description.

In step 500, a plurality of the vane arrangement segments 34 are machined, for example, to conform to one or more predetermined dimensions of a vane arrangement segment design. Referring to FIG. 4, the first and/or the second mate faces 50 and 52 of the inner platform segments 36, for example, are machined such that their inner platform widths 54 have a predetermined and substantially equal first value. The first and/or the second mate faces 64 and 66 of the outer platform segments 38 are also or alternatively machined such that their outer platform widths 68 have a predetermined and substantially equal second value.

In step 502, a plurality of the vane arrangement segments 34 are designated as base segments 84 as illustrated, for example, in FIGS. 2 and 3. At least one of the vane arrangement segments 34 is also designated as a keystone segment 86.

Figure 6:
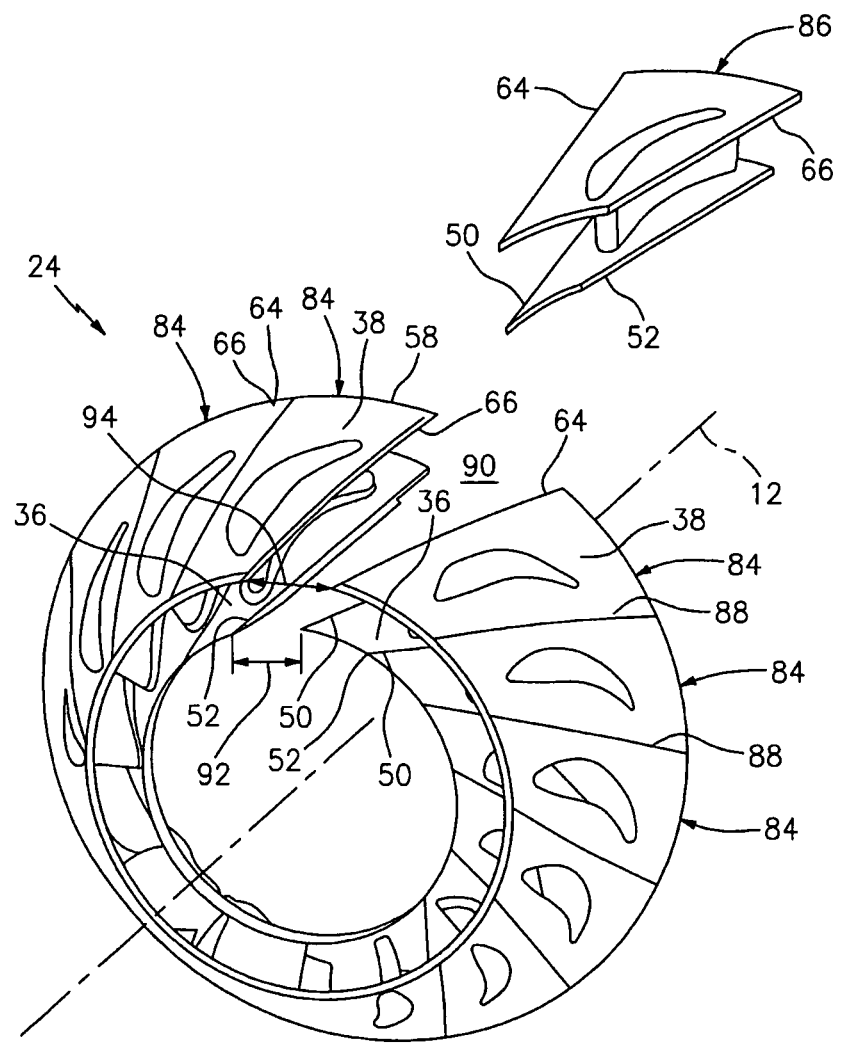
FIG. 6 is a perspective illustration of the stator vane arrangement of FIG. 2 during a step of the method of FIG. 5.

In step 504, one or more of the base segments 84 are arranged circumferentially around the axial centerline 12 as illustrated, for example, in FIG. 6. The first mate faces 50 and 64 of each of the base segments 84 are arranged adjacent to the respective second mate faces 52 and 66 of an adjacent one of the base segments 84. A predetermined bond (e.g., braze) gap 88 may extend circumferentially between adjacent base segments 84. A keystone gap 90 extends circumferentially between a pair of the base segments 84. The relative positioning of the base segments 84 may be maintained, for example, by tack welding or mechanically fastening the base segments 84 together and/or to an annular support hoop (not shown) located, for example, at the downstream platform end 58.

In step 506, circumferential widths 92 and 94 of the keystone gap 90 between the inner and/or the outer platform segments 36 and 38 are measured. In step 508, one or more of the first mate faces 50 and 64 and/or one or more of the second mate faces 52 and 66 of the keystone segment 86 are machined, as needed, to conform to the measured widths 92 and 94 of the keystone gap 90. The first and/or the second mate faces may be machined, for example, such that the keystone segment 86 may circumferentially fit within the keystone gap 90 as well as, for example, provide room for the predetermined bond gaps 88 between the keystone segment 86 and the adjacent base segments 84 (see FIGS. 2 and 3). Therefore, the inner and/or the outer platform widths 54 and 68 (see FIG. 4) of the base segments 84 may be greater than or substantially equal to the inner and/or the outer platform widths 54 and 68 of the keystone segment 86.

In step 510, the keystone segment 86 is arranged in the keystone gap 90 as illustrated, for example, in FIGS. 2 and 3. The first mate faces 50 and 64 of the keystone segment 86 are arranged adjacent to the respective second mate faces 52 and 66 of an adjacent one of the base segments 84. The second mate faces 52 and 66 of the keystone segment 86 are arranged adjacent to the respective first mate faces 50 and 64 of an adjacent one of the base segments 84. The predetermined bond gaps 88 may extend circumferentially between the keystone segment 86 and the adjacent base segments 84. The relative positioning of the keystone segment 86 relative to the base segments 84 may be maintained, for example, by tack welding the keystone segment 86 to the base segments 84 and/or to the annular support hoop (not shown).

In step 512, the vane arrangement segments 34 (e.g., the base and the keystone segments 84 and 86) are connected together. The first mate face 50 of each of the inner platform segments 36, for example, is bonded (e.g., brazed, welded or otherwise adhered) to the respective second mate face 52 of an adjacent one of the inner platform segments 36. In addition or alternatively, the first mate face 64 of each of the outer platform segments 38 is bonded to the respective second mate face 66 of an adjacent one of the outer platform segments 38.

A person of skill in the art will recognize that one or more of the foregoing steps may be omitted and/or replaced with one or more additional steps. The step 508, for example, may be replaced with a step of machining the first and/or the second mate faces of one or both of the base segments adjacent to the keystone gap. In this manner, the keystone gap may be expanded to conform to the measurements of the keystone segment as well as, for example, provide room for the predetermined bond gaps between the keystone segment and the adjacent base segments. In another example, the keystone segment may include a plurality of the vane arrangement segments which have previously been bonded (e.g., tack welded or brazed) together. In such an embodiment, the exterior mate faces of the keystone segment may be machined to conform to the measured widths of the keystone gap. In still another example, the method may further include steps of turning (e.g., machining) the inner and/or the outer platform surfaces 46 and 62 (see FIG. 4) at the upstream and/or the downstream platform ends to provide respective annular sealing surfaces 96 as illustrated, for example, in FIGS. 2 and 3. The present invention, of course, is not limited to any particular method steps and/or order of performing its method steps.

In some embodiments, the vane arrangement segments 34 may be constructed from materials such as, for example, cobalt base alloys that may be difficult to structurally weld. The mate faces 50, 52, 64 and 66 therefore may be brazed together during the step 512 to structurally connect the vane arrangement segments 34 together. Such a brazing process may cause less heat induced distortions within the vane arrangement segment material than other bonding processes such as welding. The present invention, of course, is not limited to any particular types of vane arrangement segment materials and/or bonding processes.

In some embodiments, one or more of the mate faces 50, 52, 64 and 66 may be flashed and/or plated with a material such as, for example, nickel prior to the step 512, which may improve bonding processes such as, for example, brazing.

Figure 7:
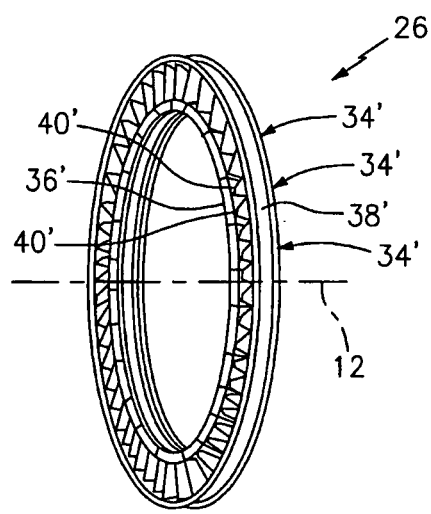
FIG. 7 is a perspective illustration of another stator vane arrangement included in the turbine engine of FIG. 1.

FIG. 7 illustrates the stator vane arrangement 26. In contrast to the stator vane arrangement 24 of FIGS. 2 and 3, one or more of the vane arrangement segments 34' of the stator vane arrangement 26 may include a plurality of airfoils 40' extending radially between the respective inner and outer platform segments 36' and 38'. Each of the vane arrangement segments 34', for example, may be formed (e.g., cast) as a unitary stator vane doublet. The present invention, of course, is not limited to any particular vane arrangement configuration and/or number of airfoils.

Figure 8:
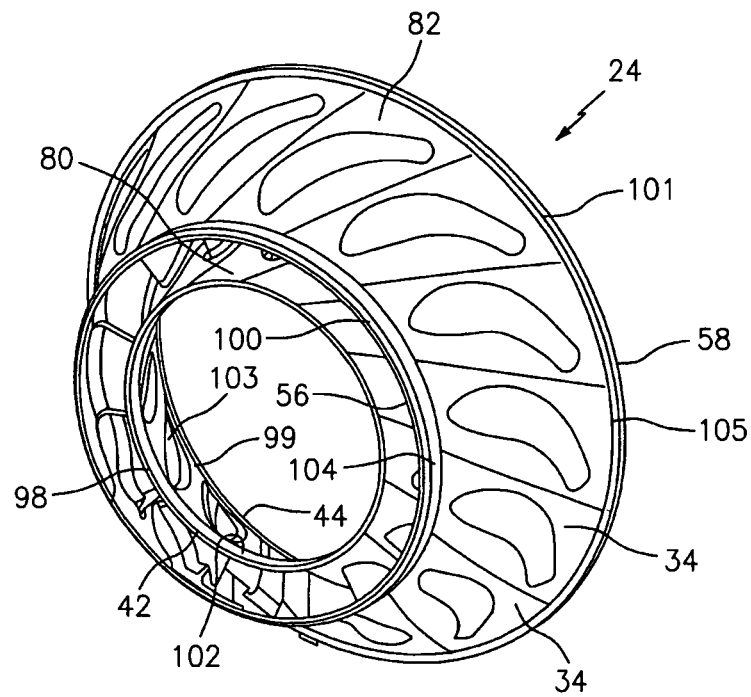
FIG. 8 is a perspective illustration of the stator vane arrangement of FIG. 2 configured with a plurality of annular bands.
Figure 9:
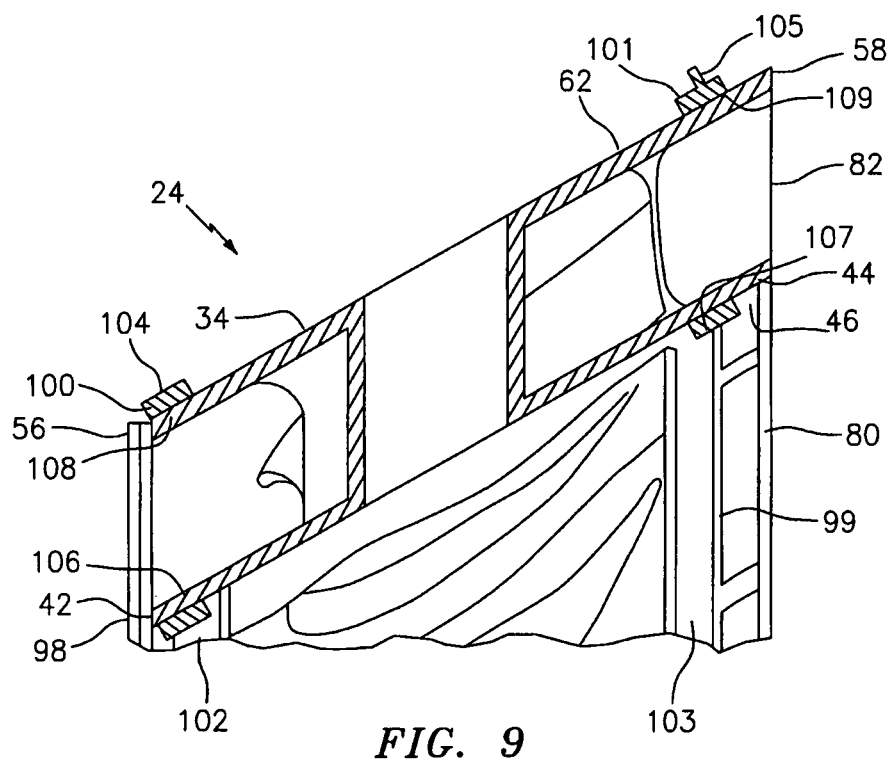
FIG. 9 is a sectional illustration of a portion of the stator vane arrangement and bands of FIG. 8.

In some embodiments, for example as illustrated in FIGS. 8 and 9, the stator vane arrangement 24 may be configured with one or more annular bands 98, 99, 100 and 101 (e.g., structural shear bands). Each of the bands 98-101 may be constructed from a unitary (e.g., non-segmented) hoop that extends circumferentially around the centerline. The bands 98 and 99 are connected (e.g., bonded or mechanically fastened) to the inner vane arrangement platform 80. The first band 98 is arranged at the upstream platform end 42, and the second band 99 is arranged at the downstream platform end 44. The bands 100 and 101 are connected to the outer vane arrangement platform 82. The third band 100 is arranged at the upstream platform end 56, and the fourth band 101 is arranged at the downstream platform end 58. These bands 98-101 may form (i) respective structural load carrying members for the stator vane arrangement 24, and/or (ii) respective seal surfaces 102-105 (e.g., seal lands, seal grooves, etc.) for engagement with stator vane arrangement 24 mating hardware.

Figure 10:
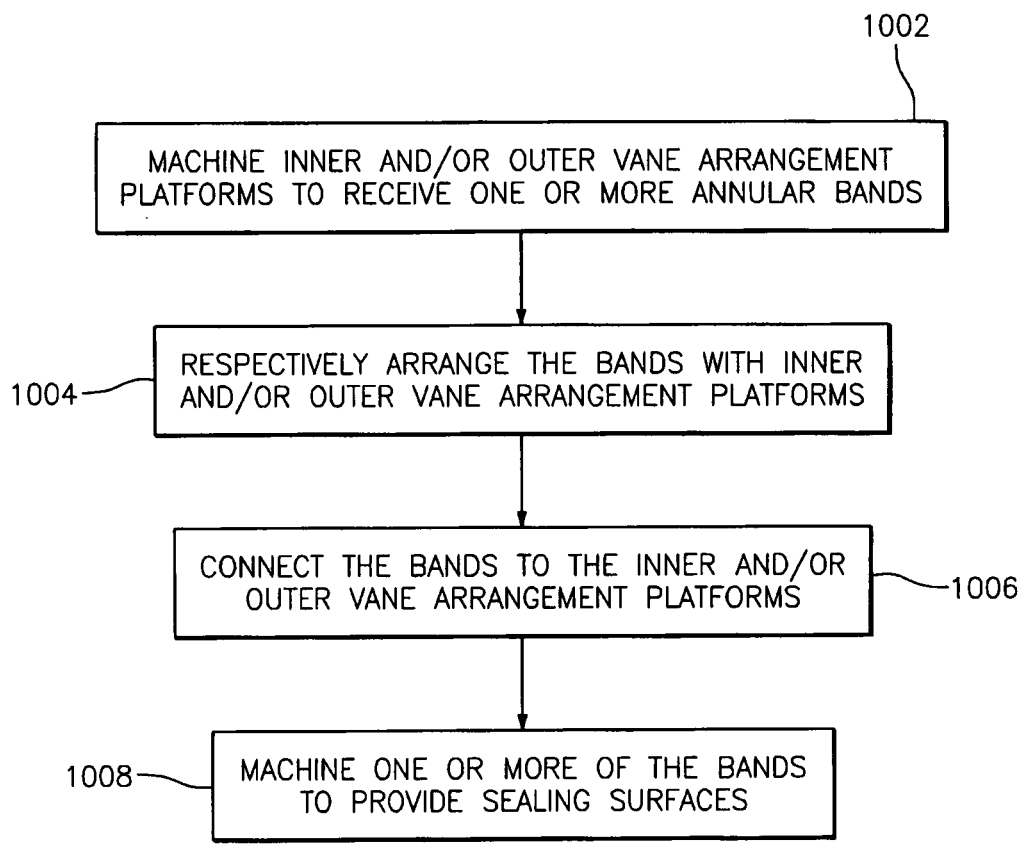
FIG. 10 is a flow diagram of a method for manufacturing the stator vane arrangement of FIG. 2 with the bands of FIGS. 8 and 9.

FIG. 10 is a flow diagram of a method for manufacturing the stator vane arrangement 24 with the bands 98-101 of FIGS. 8 and 9. In step 1002, the inner and/or the outer vane arrangement platforms 80 and 82 are machined to receive the bands 98-101. The inner platform surface 46 may be machined to provide one or more (e.g., conical) surfaces 106 and 107 at the upstream and/or the downstream platform ends 42 and 44. In addition or alternatively, the outer platform surface 62 may be machined to provide one or more (e.g., conical) annular surfaces 108 and 109 at the upstream and/or the downstream platform ends 56 and 58.

In step 1004, the bands 98 and 99 are arranged radially within the inner vane arrangement platform 80. The first band 98 is axially aligned with the surface 106, and the second band 99 is axially aligned with the surface 107. The bands 100 and 101 are arranged radially around the outer vane arrangement platform 82. The third band 100 is axially aligned with the surface 108, and the fourth band 101 is axially aligned with the surface 109. A bond gap may extend radially between one or more of the bands 98-101 and the respective surfaces 106-109. The positioning of one or more of the bands 98-101 relative to the respective surfaces 106-109 may be maintained, for example, by tack welding the bands 98-101 to the platforms 80 and 82.

In step 1006, the bands 98-101 are respectively connected to the platforms 80 and 82 and, thus, one or more of the vane arrangement segments 34. The bands 98-101, for example, are respectively bonded (e.g., brazed, welded or otherwise adhered) to the surfaces 106-109.

In step 1008, one or more of the bands 98-101 are machined to provide the respective sealing surfaces 102-105.

A person of skill in the art will recognize one or more of the foregoing steps may be omitted and/or replaced with one or more additional steps. In some embodiments, for example, one or more of the bands 98-101 and/or one or more of the surfaces 106-109 may be flashed and/or plated (e.g., nickel flashed and/or nickel plated) prior to the step 1006, for example, to improve bonding processes such as brazing. A person of skill in the art will also recognize the foregoing steps may be performed in various different orders than that described above and outlined in FIG. 10. The step 1008 may be performed, for example, before the bands 98-101 are connected to the platforms 80 and 82. The present invention therefore is not limited to any particular method steps and/or order of performing its method steps.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A method for manufacturing a turbine engine vane arrangement comprising a plurality of vane arrangement segments that include a plurality of base segments and a keystone segment, each of the vane arrangement segments comprising an airfoil extending radially between a first platform segment and a second platform segment, the first platform segment extending circumferentially between a first mate face and a second mate face, the method comprising:

physically arranging the base segments circumferentially around an axial centerline;

measuring a width of a keystone gap extending between a pair of the base segments;

machining the keystone segment based on the measured width;

physically arranging the keystone segment between the pair of the base segments; and connecting the vane arrangement segments together, wherein the connecting comprises bonding the first mate face of a first of the vane arrangement segments to the second mate face of a second of the vane arrangement segments.

2. The method of claim 1, wherein the bonding comprises brazing the first mate face of the first of the vane arrangement segments to the second mate face of the second of the vane arrangement segments.

3. The method of claim 1, wherein the second platform segment extends circumferentially between a first mate face and a second mate face; and the connecting further comprises bonding the first mate face of the second platform segment of the first of the vane arrangement segments to the second mate face of the second platform segment of the second of the vane arrangement segments.

4. The method of claim 1, wherein the machining comprises machining at least one of the first mate race and the second mate face of the keystone segment.

5. The method of claim 4, wherein the first platform segment comprises a width that extends circumferentially between the first mate face and the second mate face; and the width of one of the base segments is greater than the width of the keystone segment.

6. The method of claim 5, further comprising machining at least one of the first mate face and the second mate face of one or more of the base segments such that the widths of the base segments are substantially equal.

7. The method of claim 1, wherein the airfoil, the first platform segment and the second platform segment of one of the vane arrangement segments are integral to one another.

8. The method of claim 1, further comprising: physically arranging an annular band radially within or circumferentially around the vane arrangement segments; and connecting the band to one or more of the vane arrangement segments.

9. A method for manufacturing a turbine engine vane arrangement comprising a plurality of vane arrangement segments that include a plurality of base segments and a keystone segment, each of the vane arrangement segments comprising an airfoil extending radially between a first platform segment and a second platform segment, the first platform segment extending circumferentially between a first mate face and a second mate face, the method comprising:

physically arranging the base segments circumferentially around the axial centerline;

measuring a width of a keystone gap extending between a pair of the base segments, wherein the width of the keystone gap is different than a width of each of the base segments;

machining at least one of the pair of the base segments based on the measured width such that the keystone segment circumferentially fits within the keystone gap;

physically arranging the keystone segment between the pair of the base segments; and connecting the vane arrangement segments together, wherein the connecting comprises bonding the first mate face of a first of the vane arrangement segments to the second mate face of a second of the vane arrangement segments.

10. A method for manufacturing a turbine engine vane arrangement, comprising providing a plurality of vane arrangement segments that consists of a plurality of base segments and a keystone segment, each of the vane arrangement segments comprising an airfoil extending radially between a first platform segment and a second platform segment, the first platform segment extending circumferentially between a first mate face and a second mate face, and the first platform segment of each of the vane arrangement segments comprising a width that is equal to a first value and extends circumferentially between the first mate face and the second mate face;

physically arranging the base segments circumferentially around an axial centerline;

measuring a width of a keystone gap extending between a pair of the base segments;

machining the keystone segment based on the measured width, the machining comprising machining at least one of the first mate face and the second mate face of the keystone segment such that the width of the keystone segment has a second value that is less than the first value;

physically arranging the keystone segment between the pair of the base segments; and connecting the vane arrangement segments together, wherein the connecting comprises bonding the first mate face of a first of the base segments to the second mate face of the keystone segment.

* * * * *